Feb. 14, 1961

T. H. CORBETT 2,971,466

MEASURING PUMP

Filed March 21, 1958

Inventor
Thomas H. Corbett
By Mann, Brown and McWilliams
Attys.

Feb. 14, 1961    T. H. CORBETT    2,971,466
MEASURING PUMP
Filed March 21, 1958    3 Sheets-Sheet 2
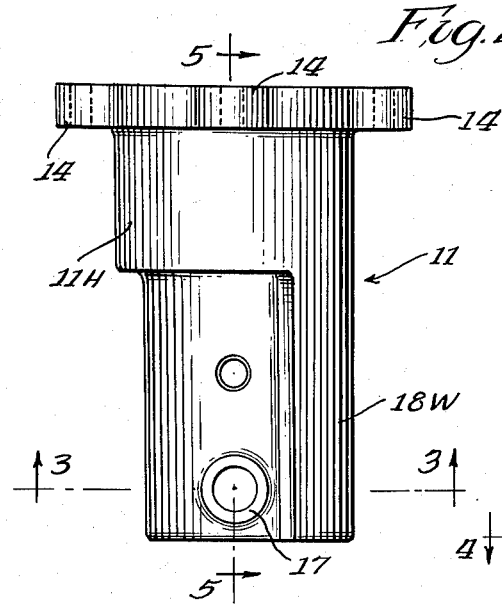
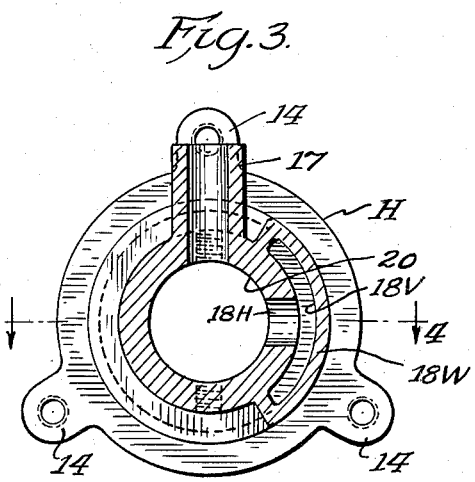
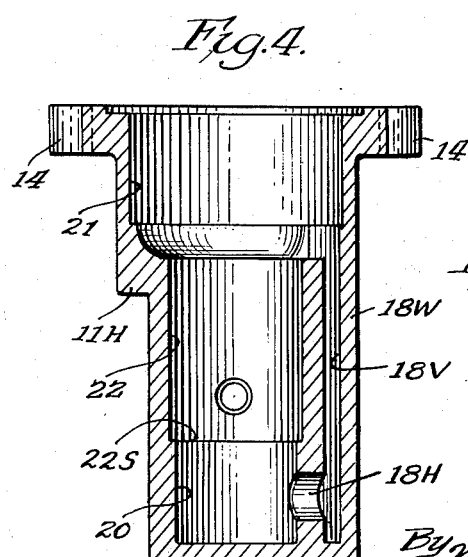
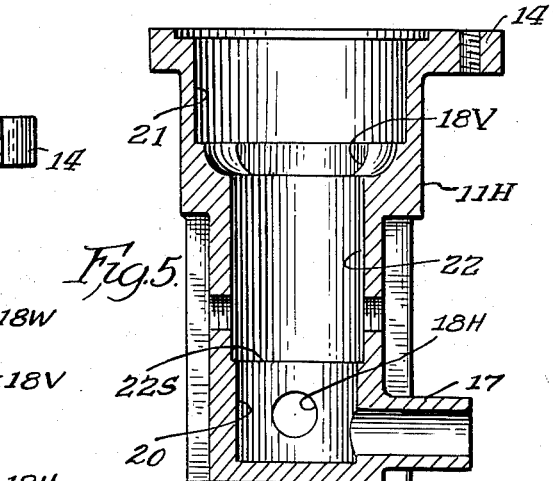
Inventor
Thomas H. Corbett
By Mann, Brown and McWilliams
Attys.

Feb. 14, 1961
T. H. CORBETT
2,971,466
MEASURING PUMP
Filed March 21, 1958
3 Sheets-Sheet 3
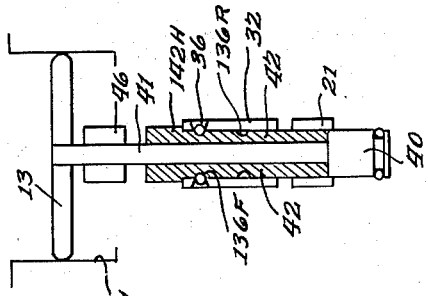
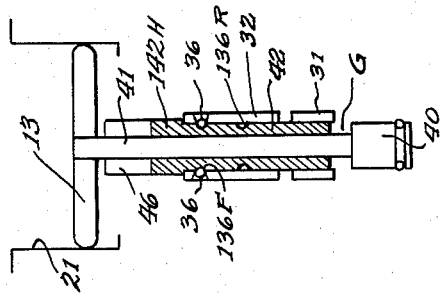
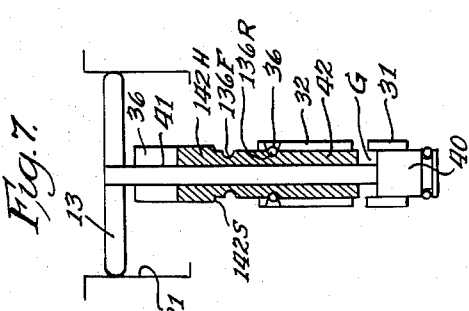
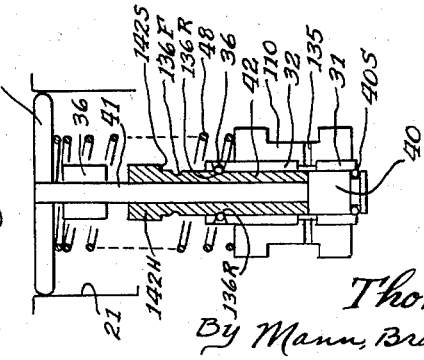
Inventor
Thomas H. Corbett
By Mann, Brown and McWilliams
Attys.

United States Patent Office 2,971,466
Patented Feb. 14, 1961

2,971,466

MEASURING PUMP

Thomas H. Corbett, 500 S. Throop St., Chicago, Ill.

Filed Mar. 21, 1958, Ser. No. 723,047

4 Claims. (Cl. 103—50)

This invention relates to measuring pumps for measuring liquid and particularly the invention relates to measuring pumps that are valveless in character.

In many situations it is desired to utilize a reciprocating pump as a measuring or metering means which will deliver a measured quantity of liquid in each cycle of operation of the measuring pump, and such a measuring operation may be performed to deliver the measured quantity either into a zone of lower pressure or a zone of higher pressure. Situations where the delivery of such measured quantities is desired are found in many processing industries or processing operations, and particularly in dish or glass washing operations where it is desired to introduce a measured quantity of a germicide, detergent or free rinsing substance into the system each time water flow is initiated into the system.

In situations of this kind it is quite important that the measurement of the treating or secondary liquid be performed accurately and in such a way that there can be no reverse feeding of the main liquid back into the secondary or treating liquid, and to enable this to be accomplished in an advantageous manner is the primary object of the present invention.

Many measuring or metering pumps are known where the measuring action is attained through the use of inlet or outlet check valves, but in many instances the use of check valves is considered to be objectionable. It is therefore another important object of the present invention to provide a measuring pump that is valveless in character, and an object related to the foregoing is to provide such a valveless pump which accomplishes its feeding measuring operation without danger of feed-back of main liquid into the treating liquid. Still another object of this invention is to provide a measuring pump of the aforesaid character that is adapted for operation by pressure and flow of the main liquid that is to be treated or mixed with the secondary liquid.

A more specific object of the present invention is to provide an injector device that is adapted to be used for example in glass washing or dish washing machinery so that the injector may operate with a measured pumping action to introduce a predetermined amount of secondary liquid each time the flow of main liquid is initiated. Another and more specific object is to provide a measuring pump of the aforesaid character wherein the measured output of the pump may be readily and easily varied within reasonably accurate limits.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 2 is a side elevational view taken from the right in Fig. 1 and showing the form of the housing;

Fig. 3 is a horizontal sectional view looking upwardly and taken substantially along the line 3—3 of Fig. 2;

Fig. 4 is a vertical sectional view taken substantially along the line 4—4 of Fig. 3;

Fig. 5 is a vertical sectional view taken substantially along the line 5—5 of Fig. 2; and Figs. 6 to 9 inclusive are diagrammatic views illustrating the parts of the measuring pump in successive positions assumed in the course of an operating cycle thereof.

Measuring pump

Figure 1:
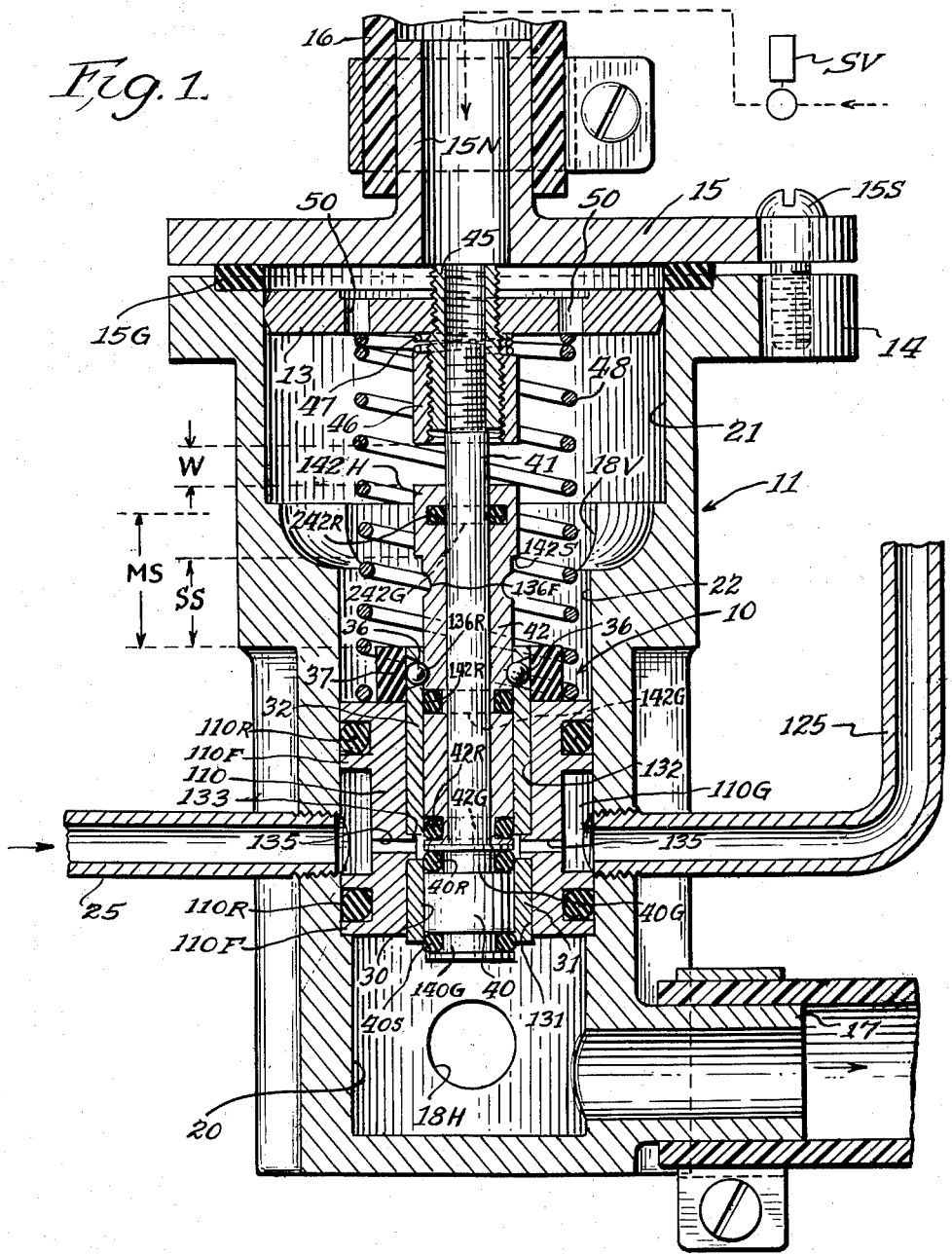
Fig. 1 is an enlarged vertical sectional view illustrating an injector mechanism embodying the features of the invention.

For purposes of disclosure the invention is herein illustrated as embodied in a measuring pump 10 which forms part of an injector 11 whereby a measured and relatively small volume of a secondary liquid is introduced into a main liquid line each time flow of a main liquid is initiated in the line. In the embodiment illustrated the pump 10 is actuated hydraulically by the pressure of the main liquid, and the hydraulically operated actuating means are provided in the housing 11H of the injector so that a main liquid such as water flowing through the housing 11H actuates an operating piston 13 to operate the pump 10 through a delivery stroke which introduces a measured amount of a secondary liquid into the main liquid as it passes on through the housing 11H.

The housing 11H, as shown in Figs. 1 to 5, is preferably in the form of a generally cylindrical casting that is open at the upper end and is flanged at such upper end to provide attaching ears 14 whereby a top plate 15 and an intermediate gasket 15G may be secured in place across the upper end, as by screws 15S. A central nipple 15N on the plate 15 may have a water inlet hose 16 clamped thereon, and this inlet connection is illustrated diagrammatically as including a solenoid valve SV whereby flow of a main liquid, such as water, through the housing 11H may be controlled. The outlet from the housing 11H is provided by a lateral nipple 17 near the lower end of the housing, and in its flow between the inlet 15N and the outlet 17 the main liquid passes through and around the operating piston 13, downwardly through a cored longitudinal passage 18 and a horizontal bore 18H in the housing 11H so as to pass into and through a discharge chamber 20 which communicates with the outlet 17. The vertical passage 18V is formed primarily by a segmented wall 18W that extends about a part of the housing 11H, as shown in Figs. 2 to 5. It is within the discharge chamber 20 that the measured charge of the secondary liquid is introduced by operation of the pump 10.

Generally considered, the pump 10 is located in that portion of the housing 11H that is immediately above the chamber 20 while the operating piston 13 is disposed just above the pump 10 within the housing. Thus the housing 11H has a stepped bore formed axially thereof to provide a relatively large upper bore 21, a smaller intermediate bore 22 and a smaller lower bore which comprises the chamber 20. The intermediate bore 22 serves to receive and position the pump 10 which has a spool-like pump body 110 that may be inserted downwardly into the bore 22 to the extent determined by the shoulder 22S at the juncture of the bores 20 and 22.

The body 110 has annularly grooves and flanges 110F and O rings 110R therein which engage the bore 22 and serve to seal opposite sides of a relatively large central groove 110G that is formed between the end flanges 110F of the pump body 110. The groove 110G that serves as a part of the supply passage for the secondary liquid that is to be measured, and a supply pipe 25 extends through the housing 11H into the bore 22 so as to communicate with groove 110G. In the present instance an additional pipe 125 similarly connects with the groove 110G, and this may be used as an additional supply line or may be extended upwardly as a standpipe which acts as a vent and as an emergency supply source.

The pump body 110 has an axial cylinder 30 formed therethrough so that its upper end opens into the upper portion of the bore 22 while its lower end opens into the discharge chamber 20, and as herein shown the cylinder 30 is provided by a pair of aligned axial sleeves 31 and 32 that are press-fitted into the body 110 in aligned relation. For the purpose of mounting the sleeves 31 and 32 the pump body 110 has aligned axial bores 131 and 132 extended into the body from opposite ends thereof, and these bores 131 and 132 are terminated in spaced relationship so that an internal spacing rib 133 is provided. The rib 133 is annular in character and projects from the sides of the bores 131 and 132 a distance that is somewhat less than the thickness of the sleeves 31 and 32. The annular rib 133 serves primarily as a stop for limiting the inserting or press-fitting movements that are applied to the sleeves, and supply passages 135 in the form of bores are extended through the body 110 from the bottoms of the groove 110G. Liquid may thus flow through the supply bores 135 and into what amounts to a final supply space that is formed between the adjacent ends of the sleeves 31 and 32 and inwardly of the rib 133.

As herein shown, the lower or shorter sleeve 31 projects slightly beyond the lower end of the pump body 110, while the upper end of the sleeve 32 projects a substantial distance above the upper end of the pump body. This upwardly projecting portion of the sleeve 32 has a pair of inwardly converging conical bores formed therethrough to house detent balls 36 which may project slightly inwardly beyond the inner ends of the conical bores to serve as detent balls, as will be described hereinafter. The balls 36 are urged inwardly by a resilient sleeve 37 that surrounds the outer surface of the sleeve 32.

The cylinder 30 that is thus provided in the pump body 110 is adapted to receive a composite piston structure that comprises a relatively short main piston 40 that has an axial piston rod 41 extended upwardly therefrom, and a sleeve piston 42 snugly and slidably surrounds the rod 41 for limited lost motion, as will be described, along the rod 41 and with respect to the main piston 40. At its upper end, the rod 41 is connected to the actuating piston 13, as will be described.

The main piston 40 has a groove 40G closely adjacent to its upper end and in this annular groove an O ring 40R is mounted. Near its lower end the main piston 40 has an annular groove 140G in which an O ring 40S is mounted. The O ring 40R projects only slightly from the annular surface of the piston 40 so that it may be drawn inwardly through the lower end of the sleeve 31 and may serve as a sealing means as the piston 40 is moved up and down within the sleeve 31. The O ring 40S, however, is somewhat differently dimensioned so that it projects for a greater distance radial from the piston 40, and this is done so that the O ring 40S may engage the lower end of the sleeve 31 and act as a stop to limit the upward or retracting movement of the main piston 40. In its upward movement, the O ring 40S engages the inner lower corner of the sleeve 31 which is slightly chamfered to facilitate entry of the other O ring 40R into the sleeve.

The sleeve piston 42 has an annular groove 42G formed near its lower end, and in this groove an O ring 42R is mounted. Spaced upwardly from the groove 42G in an amount which is somewhat gerater than the maximum stroke of the sleeve piston 42, another groove 142G is formed in the other surface of the sleeve 42, and an O ring 142R is mounted in this groove. The O rings 42R and 142R serve to afford an effective seal between the sleeve 32 and the piston 42 to prevent upward travel of the liquid between the piston 42 and the cylinder sleeve 32. Also, the lower O ring 42R, in the operation of the pump 10, moves downwardly into the lower cylinder sleeve 31 and the adjacent inner corners of the sleeves 31 and 32 are chamfered to facilitate passage of the O ring 42R back and forth between the two cylinder sleeves.

The sleeve piston 42 extends upwardly for a substantial distance above the upper end of the cylinder sleeve 32 when the piston 42 is in its upper or withdrawn position, as shown in Fig. 1, and at its upper end the sleeve 42 has a slightly enlarged head 142H which at its lower end provides a downwardly facing stop shoulder 142S which serves to limit the downward or forward stroke of the sleeve piston 42 by engagement with the upper end of the cylinder sleeve 42. Within the head 142H a groove 242G is formed in which an O ring 242R is mounted to provide a sealed relationship between the central bore of the piston bore and the piston rod 41.

As shown in Fig. 1, the sleeve piston 42 is in its fully or withdrawn rear position, and when so located, the spring retaining balls 36 are engaged with an annular groove 136R formed in the sleeve piston 42, and thus the balls 36 serve to yieldingly retain the sleeve piston 42 in its rear or retracted position. Spaced upwardly on the sleeve piston 42 an annular groove 136F is formed in such a position that when the shoulder 142S engages the upper end of the sleeve 42, the groove 136F will be disposed opposite the retaining balls 36 and will be engaged thereby so as to yieldingly retain the sleeve piston 42 in its forward position.

The attachment of the operating piston 13 to the piston rod 41 is best shown in Fig. 1 and is attained by means of a stepped and externally threaded mounting sleeve 45 which has its smaller threaded end threaded through the actuating piston 13 centrally thereof so as to firmly fix the piston 13 in the rod 41. On its larger and downwardly projecting end, the sleeve 45 has a stop sleeve 46 threaded in place thereon, and between the upper end of the sleeve 46 and the lower face of the piston 13, an expansive coil spring 47 is located so as to act to hold the abutment sleeve in any desired position of longitudinal adjustment on the threaded sleeve or fitting sleeve 45. Finally, the sleeve 45 is internally threaded, and the threaded upper end of the piston 41 is screwed into the sleeve 45 to the full extent of the threads on the rod 41. Between the piston 13 and the pump body 110, a relatively large expansion spring 48 is mounted so as to act to urge the piston 13 to its normal upper position, as shown in Fig. 1.

The piston 13 has four relatively small openings 50 formed therethrough so that water may pass through these openings, and there is a slight clearance between the edges of the piston 13 and the wall of the bore 21. The total area provided by the clearance and by the bores 50 is such that an adequate amount of water will pass therethrough, while at the same time providing for a pressure drop such that the water pressure effective on the upper face of the piston 13 is sufficient to actuate the measuring pump 10.

Operation

The normal or at rest position of the parts is shown in Fig. 1, and this position is determined by the engagement of the stop ring 40S with the lower end of the cylinder sleeve 31. When the parts are thus positioned the adjacent end surfaces of the main piston 40 and the sleeve piston 42 are engaged with each other and are located opposite the internal groove that is formed between the adjacent ends of the cylinder sleeves 31 and 32, as shown particularly in Figs. 1 and 6.

In the operation of the pump, however, the main piston 40 is moved downwardly for a predetermined distance from the relation of Fig. 6 to the relation shown in Fig. 7, while the sleeve piston 42 remains in its retracted or rear position, and an annular measuring space is thus provided about the piston rod 41 and between the adjacent ends of the pistons 40 and 42, and this measuring space has been designated as groove G in Fig. 7 of the drawings. The groove G of course remains in communication with the supply ports 35 until forward movement of the sleeve piston 42 is initiated, as will be described hereinafter, and since the groove G is of a predetermined width and depth, and will contain a measured amount of secondary liquid, it operates as a measuring means. Subsequently, as the two pistons 40 and 42 are advanced in unison, from the position of Fig. 7 to the position of Fig. 8, the measured charge or volume contained in the groove G is transported through the cylinder sleeve 31 and remains in the groove G until the groove G has been moved past the rear end of the cylinder sleeve 31, as shown in Fig. 8, at which time of course the measured charge of secondary liquid is discharged into the discharge chamber 20 so that it may mix with the water that has passed through the piston 13 and the passage 18V and 18H into this chamber.

After the operation of the measuring pump 10 has discharged its measured volume of secondary liquid into the chamber 20, and when the solenoid valve SV has been closed so as to cut off the water supply, the piston 40 is withdrawn from the position shown in Fig. 8 to the position shown in Fig. 9, and during this portion of this withdrawing movement, the sleeve piston 42 remains in its forward position as shown in Figs. 8 and 9. Hence the groove G is closed, and the relationship is such that the groove G is fully closed before the withdrawing movement of the sleeve piston 42 is initiated. During this groove-closing operation, the groove remains in communication with the chamber 20 so that any air or liquid contained in the groove G will be discharged into the discharge chamber 20. After the groove G has thus been closed, the withdrawing movement of the main piston 40 continues, and the sleeve piston 42 moves with the piston 40 from its forward position to its rearward position. Thus, the groove G is closed throughout the entire return movement through the cylinder 31, and because of this it is impossible for the present pump to transmit liquid or gas back to the secondary liquid supply source. Hence dilution of the secondary liquid is prevented by positive means.

The stroke of the sleeve piston 42 is determined in a forward direction by engagement of the shoulder 142S with the upper end of the cylinder sleeve 32, while its stroke in a rearward direction is determined indirectly by engagement of the stop ring 40S with the lower end of the sleeve 31. This stroke of the sleeve piston is indicated in Fig. 1 by the arrow SS.

The maximum width or dimension of the groove G is determined by engagement of the stop sleeve 46 with the upper end of the head 142H of the sleeve piston 42, and this dimension is indicated by the arrow W in Fig. 1 of the drawings. It will be recognized that by adjustment of the abutment sleeve 46 the dimension W may be adjusted within fairly fine limits of accuracy so as to provide for variation in the amount of secondary liquid delivered in each stroke of the pump 10.

The total stroke of the main piston is equal to the sum of the dimensions W and SS as shown in Fig. 1, and for the particular groove adjustment that is shown in Fig. 1, the length of the main stroke has been designated by the arrow MS.

Conclusion

From the foregoing description it will be apparent that the present invention provides an improved measuring pump that enables measured quantities of liquid to be delivered accurately and in such a way that the pumping mechanism requires no valves. It will also be apparent that the measured or metered liquid is delivered in such a way that there is no danger of feed-back of air or liquid into the source of such liquid, thus to avoid dilution or contamination of the source.

It will also be evident from the foregoing description that the present measuring pump is capable of ready and accurate adjustment as to its output, and that the present measuring pump is adapted to be incorporated in an injector apparatus for operation by water pressure.

Thus while I have illustrated and described a preferred embodiment of my invention as it is employed in an injector apparatus, it is to be understood that the measuring pump may be actuated by other types of means and may be employed for other purposes where measured volumes of liquids are to be delivered by the pump. It should also be understood that changes and variations may be made in the structure by those skilled in the art without departing from the spirit and scope of the appended claims.

I claim:

1. In a measuring pump, a pump body having a cylinder with a lateral supply opening intermediate its ends and said body having a discharge chamber into which one end of said cylinder opens, a piston rod disposed axially in said cylinder with a main piston fixed thereon at the end of said rod that is adjacent said chamber, actuating means connected to the other end of said rod for operating said piston from a predetermined retracted position through a forward stroke and then through a return stroke, a sleeve piston reciprocable in said cylinder and slidably surrounding said piston rod, said main piston being operable in a return stroke to engage and return the sleeve piston to a rear position wherein the engaging surfaces of the pistons are located opposite said supply opening, abutment means on said rod to engage said sleeve piston during and after completion of a portion of a forward stroke of said rod to advance said sleeve piston to a forward position wherein the leading end of the sleeve piston is located substantially at said one end of the cylinder, and yielding detent means for retaining the sleeve piston in either its forward or rear positions.

2. A measuring pump according to claim 1 wherein stop means limit return movement of the main piston and other stop means limit advancing movement of the sleeve piston, and wherein said abutment is adjustable longitudinally of the piston rod to vary the output of the pump.

3. A measuring pump according to claim 1 wherein a stop on said sleeve piston engages the rear end of the cylinder to limit forward movement of the sleeve piston, and a stop on the forward end of the main piston engages the forward end of the cylinder to limit return movement of the main piston.

4. In a measuring pump, a cylinder, an enlarged discharge chamber into which one end of the cylinder opens, a piston rod extended axially in a forward direction into the other end of the cylinder and having a main piston fixedly on the forward end thereof, a sleeve piston slidably surrounding said rod and located reciprocably within the cylinder and operable when spaced axially from said main piston to define an annular measuring groove, said cylinder having a side inlet for treating liquid and opposite which said groove may be located to be filled with treating liquid, means at the rear end of said piston rod for operating said main piston through a forward stroke in which said main piston first advances to axially separate said pistons to open said measuring groove, an abutment on said rod engageable with said sleeve piston after said groove has been opened to a predetermined extent to advance the sleeve piston in unison with said main piston to locate said pistons in predetermined advanced positions wherein said groove is disposed in said discharge chamber, and means acting on the rear end of said piston rod to return said main piston to engage said sleeve piston and close said groove while said groove remains in communication with said discharge chamber whereby further return movement of the piston rod then withdraws said pistons in unison to locate the closed groove opposite said inlet.

References Cited in the file of this patent

UNITED STATES PATENTS

| | | |
|---|---|---|
| 1,703,434 | Smith | Feb. 26, 1929 |
| 1,866,061 | Schoel | July 5, 1932 |
| 2,004,161 | Fausel | June 11, 1935 |
| 2,609,764 | Briggs et al. | Sept. 9, 1952 |